United States Patent [19]
Fulton et al.

[11] Patent Number: 4,971,267
[45] Date of Patent: Nov. 20, 1990

[54] MULTI-FUSEABLE SHAFT

[75] Inventors: James W. Fulton, San Pedro; Gregory D. Walborn, Lakewood, both of Calif.

[73] Assignee: Allied-Signal Inc., Morris Township, Morris County, N.J.

[21] Appl. No.: 310,412

[22] Filed: Feb. 13, 1989

[51] Int. Cl.$^5$ ............................................. B64C 13/24
[52] U.S. Cl. ................................ 244/75 R; 74/665 F; 74/665 G; 74/665 H; 464/32; 464/97
[58] Field of Search .................. 244/213, 75 R, 76 R; 464/32, 75, 99, 97; 74/665 R, 665 F, 665 G, 665 H

[56] References Cited

U.S. PATENT DOCUMENTS

| | | |
|---|---|---|
| 2,665,128 | 1/1954 | Guffey . |
| 2,703,847 | 3/1955 | Kalikow ............................... 464/97 |
| 2,773,369 | 12/1956 | Klemm . |
| 2,820,600 | 1/1958 | Brunner ............................... 464/97 |
| 2,892,329 | 6/1959 | Trigilio . |
| 3,321,988 | 5/1967 | Peras ..................................... 464/97 |
| 3,408,830 | 11/1968 | Sutaruk et al. ........................ 464/97 |
| 3,912,404 | 10/1975 | Katt . |
| 3,935,754 | 2/1976 | Comollo ............................. 244/213 |
| 4,256,277 | 3/1981 | Embree ............................... 244/213 |
| 4,260,121 | 4/1981 | Baston et al. ....................... 244/213 |
| 4,273,006 | 6/1981 | Woodbury ........................... 464/32 |
| 4,633,984 | 1/1987 | Hudson ............................. 244/75 R |
| 4,669,999 | 6/1987 | Miller . |
| 4,774,847 | 10/1988 | Breitweg ............................. 464/97 |
| 4,779,822 | 10/1988 | Burandt et al. ..................... 244/213 |

Primary Examiner—Galen Barefoot
Attorney, Agent, or Firm—David B. Abel; Robert A. Walsh

[57] ABSTRACT

A fuseable torsion shaft for use within an aircraft flight control surface actuation system. The fuseable torsion shaft includes a shear tube which exhibits high strength elastic characteristics during normal operation up to a predetermined shear torque level. Thereafter, a torsion shaft having lower strength plastic characteristics provides torque transmission capability for a limited deflection.

24 Claims, 3 Drawing Sheets

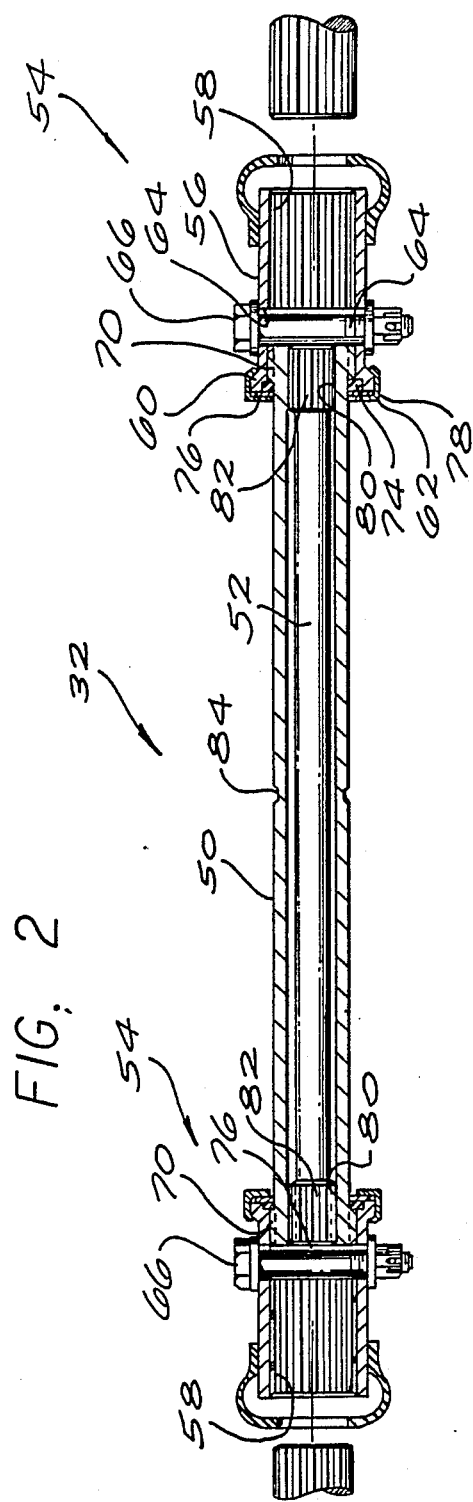
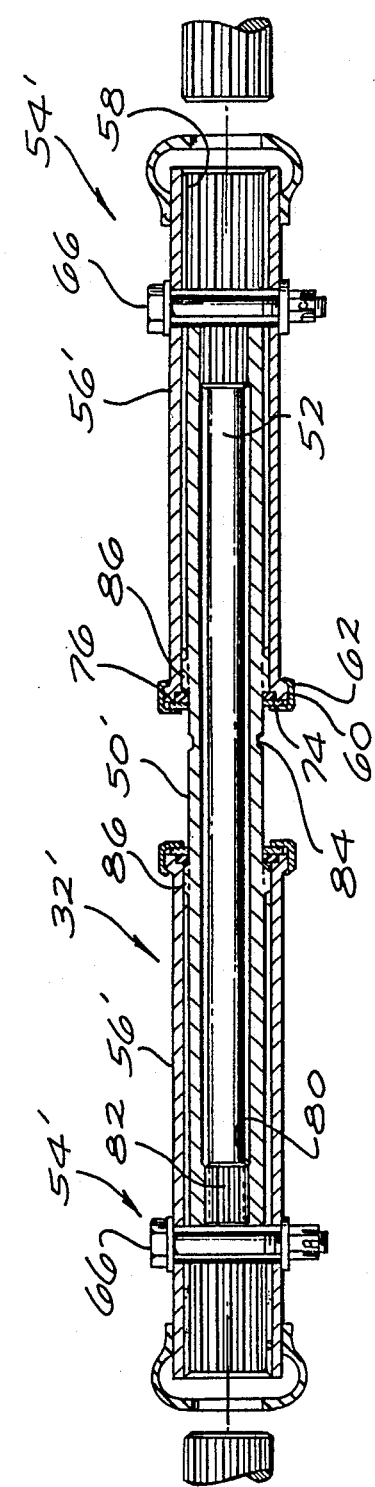
FIG. 2
FIG. 3

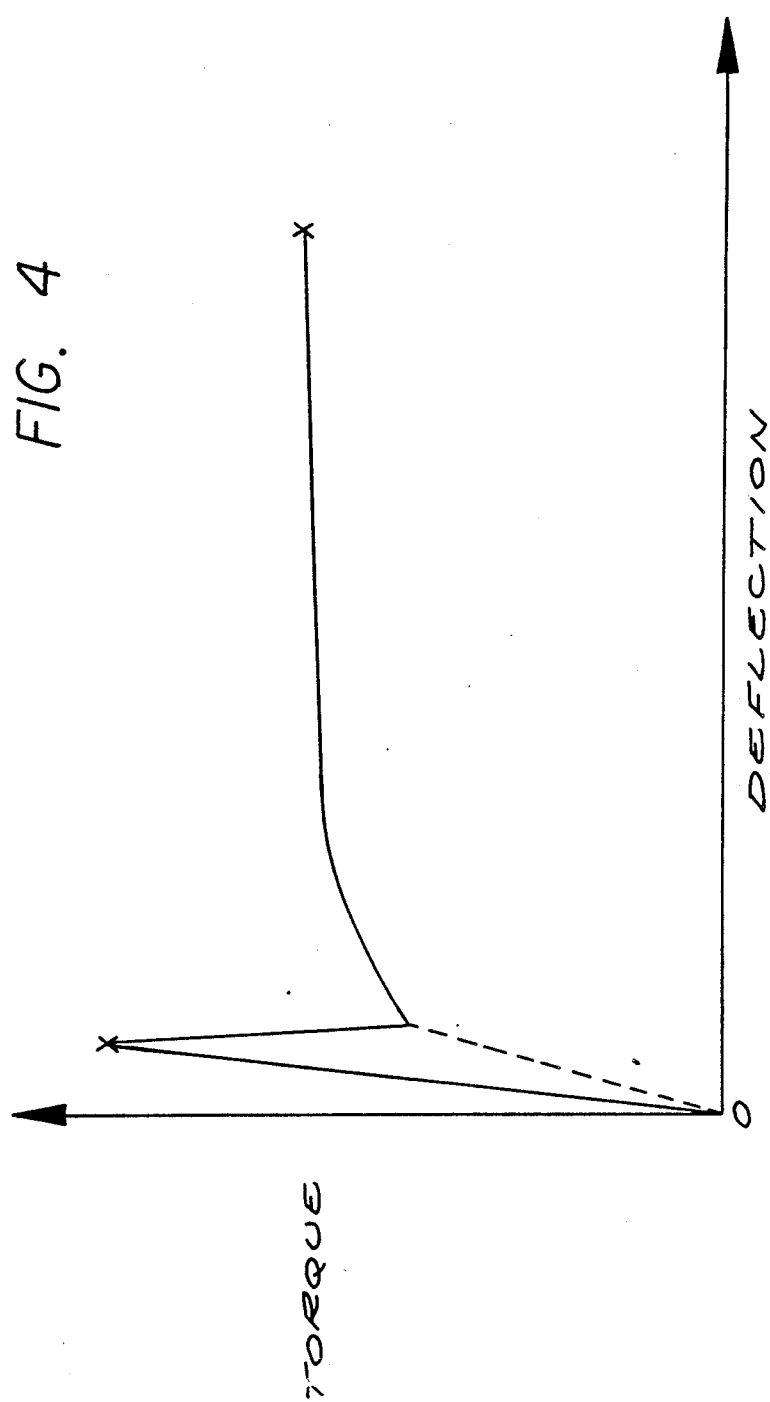

MULTI-FUSEABLE SHAFT

BACKGROUND OF THE INVENTION

This invention relates generally to the field of fuseable torsion shafts as specifically applied to an aircraft wing flap drive actuation system. The invention details a torque transmitting member that exhibits high strength elastic characteristics during normal operation and then lower strength plastic characteristics after overload. The torque transmitting member inhibits the transmission of excessive torque by partially yielding in torsion at a specific threshold load and afterward maintaining a somewhat lower torque transmission capability for a limited deflection.

In aircraft flight control, actuators are used on the leading edge flaps, the trailing edge flaps, ailerons, flaperons, and rudders in order to connect the flight control surfaces to the frame and allow adjustment of the surfaces to desired positions. The leading edge of an aircraft wing is referred to as a secondary flight control surface since the loss of its use restricts aircraft performance, but does not cripple the aircraft. Generally, mechanical actuators, either linear or rotary, are used on the leading edge of an aircraft. If an actuator jams, it is permissible that the flap be allowed to lock in the jammed position. However, a jammed actuator can cause damage to the aircraft wing if one continues to drive the jammed or remaining actuators. To prevent a jammed actuator from damaging the aircraft, the aircraft may be equipped with a sensing device which, upon sensing asymmetry between the right and left wing flaps, shuts down power to the actuators. This sensing device may also be connected to brakes built into the outboard actuators on each wing, which engage to lock the position of both wing flaps.

There are two problems associated with this type of wing flap actuation system. First, a certain amount of asymmetry between the right and left side wing flaps is allowable and at times unavoidable during certain maneuvers or when flying thru turbulent air. However, it is also desirable to shut down the actuation system as quickly as possible whenever an actuator jams to prevent damage to the aircraft. Thus, the sensing device must be calibrated to balance these conflicting requirements, and prevent unnecessarily shuting down the actuation system. This is accomplished by calibrating the sensing device to shut down the actuation system whenever the right and left side wing flaps are more than a few degrees out of symmetry. Occasionally, however, this small asymmetry limit causes shut down of the actuation system during normal operations, i.e. when there is not a jammed actuator. Similarly, an electronic malfunction can cause inadvertent shutdown. This is referred to as "nuisance braking", and results in loss of the use of the secondary control surfaces.

Secondly, due to the very high rotational speeds at which the actuators are driven, coupled with the delay involved with shutting down the power drive unit, the shafts connecting the power drive unit to the actuators may be driven through as many as approximately ten full revolutions prior to system shutdown. On the wing including the failed actuator, this results in a large torque buildup between the power drive unit and the failed actuator, a portion of this torque potentially acting to twist the wing flap inboard of the failed actuator. After system shutdown, the opposite wing actuation system distributes the torque between the power drive unit and the outboard actuator which includes the brake. This torque buildup may severely damage the remaining actuators, mounting brackets, flaps, wing frame, or drive shafts.

To prevent major damage due to nuisance braking, the drive shaft immediately inside of the outboard actuator may be designed to shear at a specified torque. Thus, the outboard actuator and the flap will be locked by the actuator brake, while the opposite wing flap is skewed up to approximately two degrees by the free actuators. A disadvantage associated with this system is that a nuisance braking event will cause the actuator brakes on both sides to lock, possibly shearing the outboard drive shafts, and locking the position of the flaps, potentially in an undesirable position. Additionally, no protection is provided to the actuator system side which includes the failed or jammed actuator.

DESCRIPTION OF THE DRAWINGS

FIG. 2 shows a cross sectional view of a fuseable shaft for use within the drive system of FIG. 1.

FIG. 3 shows a cross sectional view of an alternate embodyment of the fuseable shaft of FIG. 2.

FIG. 4 is a graph showing rotational deflection versus torque for the fuseable shaft of FIG. 1.

DETAILED DESCRIPTION OF THE PREFERRED EMBODIMENT

Figure 1:
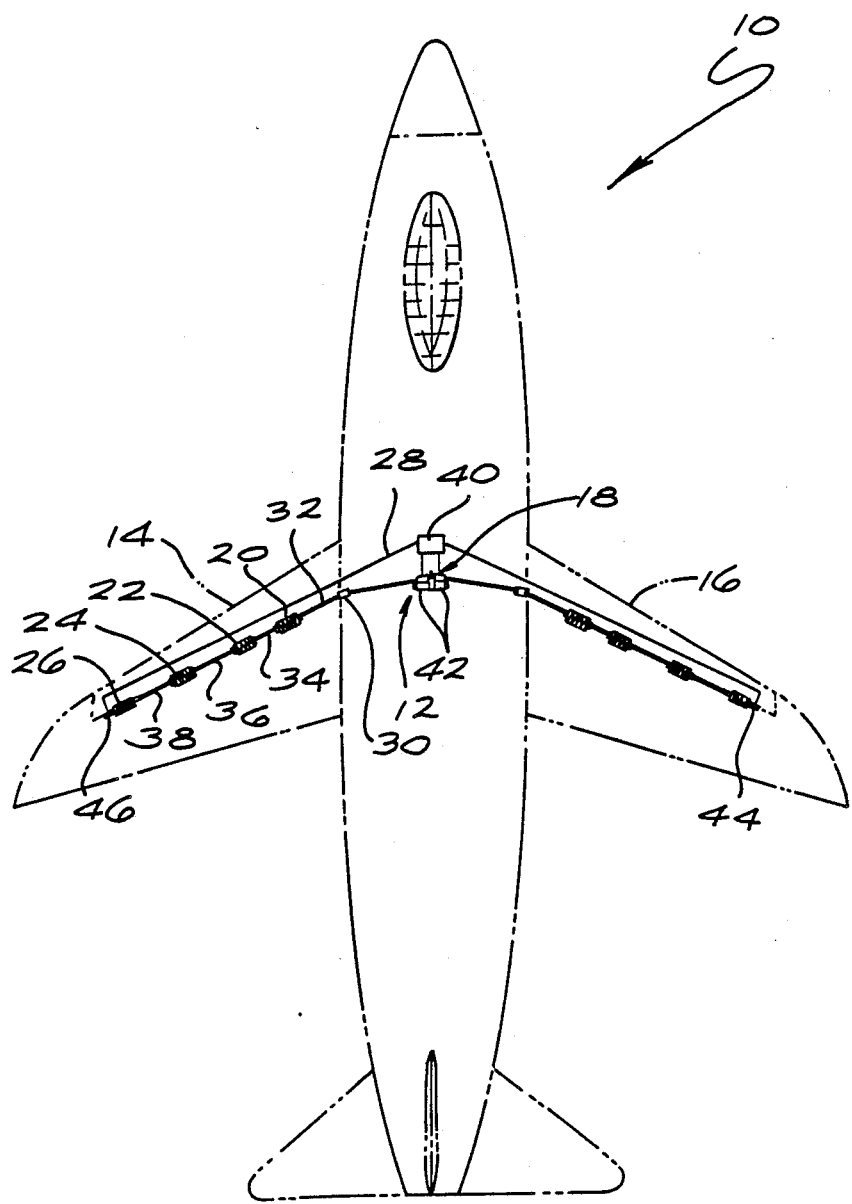
FIG. 1 shows a schematic representation of an aircraft including a leading edge flap drive system.

FIG. 1 shows a schematic representation of an aircraft 10 including an actuation system 12 to drive a pair of leading edge flaps 14, 16. The actuation system 12 includes a power drive unit 18 which drives first, second, third and forth actuators 20, 22, 24, and 26, each individually attached to the leading edge flap 14. A pair of inboard torque shafts 28 extend from the power drive unit 18 to angle gearboxes 30 at their outboard end. The angle gear boxes 30 are in turn connected to fuseable shafts 32 which extend out to the first actuators 20. First, second, and third shafts 34, 36, and 38 interconnect the first actuators 20 with the second actuators 22, the second actuators 22 with the third actuators 24, and the third actuators 24 with the fourth actuators 26, respectively. The actuation system 12 also includes an electronic controller 40, which is connected to a pair of rotational position transducers 42 on each side of the power drive unit 18, as well as rotational position transducers 44 and 46 located at the outboard end of forth actuators 26.

In operation the power drive unit 18 rotationally drives the torque shafts at a relatively high rotational speed. The actuators 20, 22, 24 and 26 include torque multiplying, speed reducing features which substantially reduce the rotational output to the flaps 14, 16, on the order of for example from 300:1, to 1000:1. Thus, in order to move the flaps 14, 16 thru an angle of ten degrees the shafts would rotate approximately ten times (for an actuator reduction ratio of 360:1). In order to prevent severe damage to the aircraft 10, the electronic controller 40 receives position signals from transducers 42 on the power drive unit 18 and from the transducers 44 and 46 on the fourth actuators 26. The electronic controller 40 compares these signals to determine weather the actuators are being properly driven by the power drive unit 18. In the event that the signals do not match, the electronic controller 40 activates a brake within the fourth actuators 26, locking the position of the actuators 26. The electronic controller 40 also simultaneously shuts off power to the power drive unit 18, thus effectively shutting down the actuation system 12. The electronic controller 40 is calibrated to shut down the actuator system upon sensing a few degrees of misalignment between the two leading edge flaps 14, 16. Misalignment of the flaps 14, 16 may be caused by jamming of an actuator which will effectively freeze the rotational position of the actuator as well as the flap 14 or 16. However, during the few milliseconds required to activate the brakes and shut down power to the drive unit 18, the power drive unit 18 will have driven the shafts inboard of the jammed actuator thru approximately one to ten full revolutions. The fuseable shafts 32 are designed to inhibit the transmission of excessive torque by yielding in torsion at a specific threshold load and afterwards maintain a lower torque transmission capability for a limited deflection.

FIGS. 2 and 3 show cross-sectional views of two embodiments of the fuseable shaft 32 of the present invention. The fuseable shafts 32 each include four major components, a shear tube 50, a torsion shaft 52, and a pair of end couplings 54. Each end coupling 54 includes a sleeve 56 having an internal spline 58. The sleeve 56 also includes a swaged ridge 60 at one end, with a machined lip 62 interior to the ridge 60. The sleeve 56 also includes diametrically opposed holes 64, through which is inserted a positioning bolt 66. The shear tube 50, which includes outer spline teeth 70, is inserted into sleeve 56 of end coupling 54, to butt against positioning bolt 66. The outer spline teeth 70 of shear tube 50 mesh with the spline teeth 58, to provide power transmission between the sleeve 56 and the shear tube 50. The shear tube 50 is then affixed to the sleeve 56 by a rubber seal 74, fitted within lip 62 of sleeve 56 around shear tube 50, a pair of half washers 76, and a retainer 78 press fit around ridge 60.

The torsion shaft 52 is inserted into the shear tube 50, which includes internal spline teeth 80 to mesh with spline teeth 82 on each end of the torsion shaft 52. Within the configuration shown in FIG. 2, there is a desired amount of free play designed into the spline connection between shear tube 50 and torsion shaft 52. This is required to prevent the torsion shaft 52 from acting as a parallel, as opposed to a backup system for shear tube 50. The shear tube 50 also includes a weak point groove 84 spaced somewhere between the end couplings 54.

The fuseable shaft 32' of FIG. 3 is similar to FIG. 2 with the substitution of longer sleeves 56' within each of the end couplings 54'. The longer sleeves 56' extend a substantial distance about the shear tube 50'. The spline connections 86 between the respective end couplings 54' and the shear tube 50' are located relatively close to the weak point groove 84. Within this configuration, the spline connection between the shear tube 50' and the torsion shaft 52 is designed for a tight fit.

Normally, the spline connections at opposite ends of torsion shaft 52 would be aligned during assembly. However, it is also contemplated that the torsion shaft 52 and the shear tube 50' could be pre-stressed by indexing the spline connections during assembly. This pre-stressing would allow directional tailoring of the residual torque and cut-out shear forces within the fuseable shaft assembly 32.

Within the fuseable shafts of either FIG. 2 or FIG. 3, the shear tubes 50, are fabricated out of a high strength material, such as HP 9430 steel which is heat treated so as to be relatively hard. The shear tubes 50 includes a weak point, such as a groove 84 machined into the exterior surface. The depth of groove 84 may be adjusted so as to provide a relatively precise shear torque strength for the shear tubes 50. The torsion shafts 52 is also made from a high strength material, such as HP 9430 steel, however, the torsion shafts 52 is heat treated so as to be relatively ductile.

Within a conventional aircraft application, the fuseable shaft 32 is installed between the power drive unit 18 and the first actuator 20. Under normal operating conditions, torque is transmitted via the shear tube 50. In the event of an actuator failure or flap misalignment, the shear tube 50 will shear at the weak point groove 84. Subsequently, the torsion shaft 52 will twist, absorbing the torque being placed on the system until the power drive unit 18 is shutdown by the controller 40. These characteristics are shown graphically within FIG. 4 wherein rotational deflection of the fuseable shaft is plotted against torque. As shown within FIG. 4, increasing the torque applied to the fuseable shaft initially results in very little rotational deflection. However, once the shear tube 50 shears, there is an immediate drop in the torque as now transmitted by the torsion shaft 52. This torque will remain relatively constant while the torsion shaft 52 experiences substantial rotational deflection.

In the event of a nuisance braking situation, i.e. where the wing flaps are temporarily misaligned so as to engage the controller shutdown function, the shear tubes on both sides of the aircraft may shear. However, the torsion shafts will not shear, and may be used to drive the wing flaps by resetting the electronic controller 40, and re-engaging the power drive unit 18. As depicted in FIG. 4, the torsion shaft is capable of transmitting a significant percentage of the maximum torque of the torque shaft. Within the range below the elastic deformation torque level, the torsion shaft 52 exhibits an angular deflection versus torque characteristic closely approximating that of the torque shaft 50. Thus, for normal torque operation levels, the torsion shaft 52 can transmit the required torque with acceptable deflection to allow operation of the system without substantial asymmetry between the left and right side actuation systems.

Thus it may be appreciated that the fuseable shaft of the present invention is a significant improvement in the field of aircraft flight control surface actuation systems. While the fuseable shaft has been detailed above as an integral part of an actuation system for an aircraft wing flap, it is anticipated that those skilled in the art may find alternative applications for the fuseable shaft of the present invention. Accordingly, while specific embodiments of the invention have been illustrated and described, it is understood that those are provided by way of example only, and the invention is to be construed as being limited only by the proper scope of the following claims.

We claim:

1. A multi-fuseable shaft torque transfer assembly comprising:
   a first member having predetermined torsional shear strength;
   a second member having a desired torsional yield strength, said torsional yield strength being less than the torsional shear strength of said first member while having a torque transmission capability sufficient to transmit a significant percentage of said predetermined torsional shear strength torque of said first member; and a pair of end coupling means mounted at opposite ends of said first and said second members for coupling said members to rotational drive and driven mechanical elements.

2. The assembly of claim 1 wherein said second member has a torque versus angular deflection characteristic closely approximately the torque versus deflection characteristic of said first member in the torque range below the elastic deformation torque load of said second member.

3. The assembly of claim 1 wherein said first member and said second member are co-axially mounted between said pair of end coupling means.

4. The assembly of claim 3 wherein said first member and said second member are cooperatively oppositely prestressed with respect to one another during assembly.

5. A multi-fuseable shaft torque transfer assembly comprising:
   a first shear member having a predetermined torsional shear strength corresponding to a torsional shear weak point
   a second torsion member disposed axially concentric with respect to said shear tube and having a desired torsional yield strength, said torsional yield strength being less than the torsional shear strength of said first member;
   a pair of end coupling means mounted at opposite ends of said first and said second members for coupling said members to rotational drive and driven mechanical element; and
   means for connecting said end couplings to the ends of said shear member and said torsion member such that torque transmitted from one to the other of said end couplings, up to said torsional yield strength of said shear member is transmitted by said shear member.

6. The torque transfer assembly of claims 5 wherein said first shear member comprises:
   a cylindrical shear tube having a torsional shear weak point.

7. The torque transfer assembly of claim 6 wherein said second member comprises:
   a torsion shaft disposed within said shear tube.

8. The torque transfer assembly of claim 6 wherein said torsional shear weak point is a circumferential groove machined into said shear tube.

9. The torque transfer assembly of claim 5 wherein said means for connecting comprises:
   first spline connections between said end couplings and said shear tube; and
   second spline connections between said shear tube and said torsion shaft, said second spline connections located proximate the ends of said torsion shaft.

10. The torque transfer assembly of claim 9 wherein said torsion shaft is a shaft of high strength steel heat treated so as to be relatively ductile.

11. The torque transfer assembly of claim 9 wherein said first spline connections between said end couplings and said shear tube are positioned close to said torsional shear weak point of said shear tube.

12. The torque transfer assembly of claim 5 wherein said shear tube is a cylinder of high strength steel heat treated so as to be relatively brittle.

13. A flight control surface actuation system for an aircraft having a plurality of symmetrical flight control surfaces, comprising
   at least one power drive unit;
   a plurality of actuators spaced along the length of each of said flight control surfaces, privotally connecting said flight control surfaces to said aircraft;
   a plurality of torque shafts interconnecting successively spaced actuators of said plurality of actuators; and
   means for connecting at least one power drive unit to said plurality of actuators and for inhibiting transmission of excessive torque by yielding in torsion at a specific threshold load and afterward maintaining a lower torque transmission capability with limited angular deflection for torque levels up to a substantial percentage of said threshold load.

14. The actuation system of claim 13 where said means for connecting further provides for maintaining connection of said power drive unit to said actuators throughout substantial relative angular deflection and torque transfer between said power drive unit and said actuators.

15. The actuation system of claim 13 further comprising:
   a pair of rotational position sensors integral with each of said at least one power drive unit(s) to sense the angular position of the outputs of said power drive unit(s);
   a second set of rotational position transducers, one each proximate the most outboard of said plurality of actuators to sense the angular position of said actuator; and
   an electronic control means, electrically connected to each of said rotational position sensors, for shutting down power to said power drive unit upon detecting asymmetry between the angular position of said flight control surfaces driven by said power drive unit.

16. The actuation system of claim 15 wherein said means for connecting comprises:
   a first member having a predetermined torsional shear strength;
   a second member having a desired torsional yield strength, said torsional yield strength being less than the torsional shear strength of said first member; and
   a pair of end coupling means mounted at opposite ends of said first and said second members for coupling said members to rotational drive and driven mechanical elements.

17. A flight control surface actuation system for an aircraft having a plurality of symmetrical flight control surfaces, comprising:
   at least one power drive unit;
   a plurality of actuators spaced along the length of each of said flight control surfaces, privotally connecting said flight control surfaces to said aircraft;
   a plurality of torque shafts interconnecting successively spaced actuators of said plurality of actuators;
   a pair of rotational position sensors integral with each of said at least one power drive unit(s) to sense the angular position of the outputs of said power drive unit(s);
   a second set of rotational position transducers, one each proximate the most outboard of said plurality of actuators to sense the angular position of said actuator;

an electronic control means, electrically connected to each of said rotaional position sensors, for shutting down power to said power drive unit upon detecting asymmetry between the angular position of said flight control surfaces driven by said power drive unit;

a first member having a predetermined torsional shear strength;

a second member having a desired torsional yield strength, said torsional yield strength being less than the torsional shear strength of said first member;

a pair of end coupling means mounted at opposite ends of said first and said second members for coupling said members to rotational drive and driven mechanical element; and means for connecting said end couplings to the ends of said first member and said second member such that torque transmitted from one to the other of said end couplings, up to said torsional yield strength of said first member, is transmitted by said first member, said first member, said second member and said end couplings connecting said at least one power drive unit to said plurality of actuators and inhibiting transmission of excessive torque by yielding in torsion at a specific threshold load and afterward maintaining a significant torque transmission capability for a limited deflection.

18. The actuation system of claim 17 wherein said second member comprises:
a torsion shaft disposed within said shear tube.

19. The actuation system of claim 18 wherein said first member comprises:
a cylindrical shear tube having a torsional shear weak point.

20. The actuation system of claim 19 wherein said torsional shear weak point is a circumferential groove machined into said shear tube.

21. The actuation system of claim 17 wherein said means for connecting comprises:
first spline connections between said end couplings and said shear tube; and
second spline connections between said shear tube and said torsion shaft, said second spline connections located proximate the ends of said torsion shaft.

22. The actuation system of claim 21 wherein said torsion shaft is a shaft of high strength steel heat treated so as to be relatively ductile.

23. The actuation system of claim 21 wherein said first spline connections between said end couplings and said shear tube are positioned close to said torsional shear weak point of said shear tube.

24. The actuation system of claim 17 wherein said shear tube is a cylinder of high strength steel heat treated so as to be relatively brittle.

* * * * *